United States Patent [19]

Maeda et al.

[11] Patent Number: 4,732,807

[45] Date of Patent: Mar. 22, 1988

[54] PLATED RESIN ARTICLE

[75] Inventors: Tetsuro Maeda; Fukuaki Wada; Susumu Ohoka; Akihiro Okamoto, all of Chiba, Japan

[73] Assignee: Denki Kagaku Kogyo K.K., Japan

[21] Appl. No.: 700,222

[22] Filed: Feb. 11, 1985

[30] Foreign Application Priority Data

Feb. 9, 1984 [JP] Japan ............................ 59-22647

[51] Int. Cl.$^4$ .................. B32B 15/06; B32B 15/08; B32B 27/08
[52] U.S. Cl. ............................ 428/327; 428/462; 524/325; 524/384; 524/385; 524/386; 524/388; 525/57; 525/80; 525/84
[58] Field of Search ........................... 428/327, 462

[56] References Cited

U.S. PATENT DOCUMENTS 3,669,714 6/1972 Wiley .................................. 428/462
3,887,746 6/1975 Grancio et al. .................... 428/462

*Primary Examiner*—Jacob Ziegler
*Attorney, Agent, or Firm*—Sughrue, Mion, Zinn, Macpeak, and Seas

[57] ABSTRACT

A molded article of a transparent ABS resin comprising 10 to 24% by weight of a diene type rubber having a weight average particle size of 150 m$\mu$ or less and not containing methyl methacrylate in the continuous resin phase is subjected to wet plating. The resulting plated resin article has an excellent adhesion of the plating layer and a good transparency.

5 Claims, No Drawings

PLATED RESIN ARTICLE

BACKGROUND OF THE INVENTION (1) Field of the Invention

The present invention relates to a plated article of a transparent acrylonitrile-butadiene-styrene resin (hereinafter referred to as "ABS resin") obtained by wet plating. Herein, the term of "transparent" is used as merely meaning a light-transmitting property, not transparent like glass.

(2) Description of the Prior Art

The ABS resin is known as a resin suitable for a plastic plating (e.g. "A Study of the Etching Effect on the Metal-to-ABS Surface Adhesion in Electroless Plating", S. P. Poa, C. C. Wan & C. J. Wu, Metal Finishing, Aug. 13~16 (1977); "A study of Factors Affecting Peel Adhesion of Electroplated Coatings on ABS and Polypropylene", J. K. Dennis and P. Tipping, Electroplating and Metal Finishing, Nov. 9~≠(1974); Japanese Pat. Kokai Koho No. 54-103456).

A plated resin article obtained by plating of a transparent ABS resin, especially a partially plated resin article, has an information display function utilizing as a signal a change of the intensity of transmitted light and/or the color of transmitted light, because an unplated portion (non-plated portion) has a light-transmitting property. For example, the shape of the non-plated portion is utilized as a symbol indicating a function state to be discriminated by this symbol. As specific embodiments, there can be mentioned applications to switches and push buttons of light electric appliances, and if a shape of a letter is given to the non-plated portion, the on-off state of a switch or push button indicated by this shape can be displayed.

Although a plated resin article obtained by plating of a transparent ABS resin is industrially valuable, only a very few products of this type are practically utilized. This is because it is difficult to form a tight wet-plating layer on a transparent ABS resin.

In a plated resin article, since the difference of the linear thermal expansion coefficient between the metal phase and the resin phase is very great, peeling of the plating layer from the surface of the resin is readily caused according to the change of the ambient temperature, and this undesirable phenomenon is especially conspicuous in a transparent ABS resin.

In the production of a transparent ABS resin, it is generally necessary to accord the refractive index of the dispersed rubber phase with that of the continuous resin phase, and for this purpose, methyl methacrylate is ordinarily added to monomers constituting the continuous resin phase. However, we have found that where a compound having an ester bond is contained in the continuous resin phase, the adhesion of the plating layer in the final plated ABS resin article is extremely poor. In view of this fact, in order to obtain a plated article of a transparent ABS resin having a plating layer excellent in the adhesion, it is considered necessary to subject a transparent ABS resin, which does not contain a compound having an ester bond, that is, methyl methacrylate, in the continuous resin phase, to wet plating.

SUMMARY OF THE INVENTION

It is a primary object of the present invention to provide a plated article of a transparent ABS resin in which the plating layer has a good adhesion and the continuous resin phase does not contain a methyl methacrylate component.

In accordance with the present invention, there is provided a plated resin article which is formed by subjecting a molded article of a transparent ABS resin which comprises 10 to 24% by weight of a diene type rubber having a weight average particle size of 150 mμ or less and does not contain a methyl methacrylate component in the continuous resin phase.

DETAILED DESCRIPTION OF THE INVENTION

The transparent ABS resin used in the present invention is preferably prepared by emulsion-polymerizing a monomer mixture comprising a vinyl cyanide monomer and an aromatic vinyl monomer in the presence of a diene type rubber latex having a specific weight average particle size. Herein, the weight average particle size (dw) may be represented by the formula, $$dw = \Sigma f_i d_i^4 / \Sigma f_i d_i^3$$

wherein $f_i$ stands for the fractional ratio of particle size ($d_i$). An absorbance of latex having a known dw is measured provided that the wave length of incident light and concentration of the latex are under a given condition. A calibration curve indicating the relationship between the dw and the absorbance is prepared. Next, an absorbance of latex having an unknown dw is measured under the same condition and the dw is determined using said calibration curve.

As the diene type rubber used in the present invention, there can be mentioned polybutadiene, polyisoprene, polychloroprene, poly(butadiene-styrene), poly(butadiene-methyl methacrylate) and poly(butadiene-acrylonitrile). As the vinyl cyanide monomer, there can be mentioned acrylonitrile and methacrylonitrile, and as the aromatic vinyl monomer, there can be mentioned styrene, α-methylstyrene, t-butylstyrene and vinyl-toluene.

The transparent ABS resin of the present invention comprises a diene type rubber having a weight average particle size of 150 mμ or less, preferably 100 mμ or less. In the case of an ABS resin comprising a diene type rubber having a weight average particle size exceeding 150 mμ, the transparency is poor, and this ABS resin is not suitable for attaining the objects of the present invention.

The transparent ABS resin of the present invention should comprise 10 to 24% by weight of a diene type rubber. If the content of the diene type rubber is lower than 10% by weight, the adhesion of the plating layer is insufficient while if it exceeds 24% by weight, the flowability is reduced and no good results can be obtained.

According to one preferred embodiment of the present invention, a mixture comprising 16 to 96% by weight of an ABS resin containing 25 to 62.5% by weight of a diene type rubber and 4 to 84% by weight of a vinyl cyanide-aromatic vinyl compound copolymer resin (hereinafter referred to as "AS resin") is used as the transparent ABS resin. In this embodiment, if the diene type rubber content in the ABS resin is lower than 25% by weight, the adhesion of the plating layer is insufficient while if it exceeds 62.5% by weight, silver streaks are formed on the surface of the resulting shaped article and no good results can be obtained. In the AS resin, as the vinyl cyanide monomer, there can be mentioned acrylonitrile and methacrylonitrile and as the aromatic vinyl monomer, there can be mentioned styrene, α-methylstyrene, t-butylstyrene and vinyltoluene.

In this preferred embodiment, an alcohol or a phenol may be added to the transparent ABS resin. As the alcohol, there can be used higher aliphatic alcohols, polyhydric alcohols, polyalkylene glycols, polyvinyl alcohols and aromatic alcohols. As specific examples, there can be mentioned higher aliphatic alcohols such as octyl, decyl, dodecyl, tetradecyl, hexadecyl, octadecyl, and oleyl alcohols, polyhydric alcohols such as glycerol, pentaerythritol, sorbitan, sorbitol and glucose, polyalkylene glycols such as polyethylene glycol, polypropylene glycol, block polyoxyethylene-polyoxypropylene polymers, polyethylene glycol monoalkyl ethers and polypropylene glycol monoalkyl ethers, polyvinyl alcohols such as partially or completely saponified polyvinyl alcohols, and aromatic alcohols such as benzyl and cinnamyl alcohols. As the phenol, there can be mentioned, for example, phenol, cresol, catechol and 2,2-bis(4'-hydroxylphenyl)propane.

An alcohol or phenol having a boiling point higher than about 200° C. is optionally selected as the one effectively used in the present invention, but use of a compound having a carbonyl bond in the molecule is not preferred because the adhesion strength of the plating layer in the resulting plated resin article is reduced because of the presence of such a compound.

In the present invention, it is preferred that the alcohol or phenol be added to the ABS resin in an amount of 0.1 to 10 parts by weight, especially 0.5 to 8 parts by weight, per 100 parts by weight of the ABS resin. If the amount of the added alcohol or phenol is smaller than 0.1 part by weight, the effect of improving the adhesion strength of the plating layer is insufficient, while if it exceeds 10 parts by weight, the adhesion strength of the plating layer is reduced and furthermore, the rigidity and heat resistance of the ABS resin are degraded.

The plated resin article of the present invention is prepared by subjecting the transparent ABS resin composition formed in the above-mentioned manner to wet plating. A known wet plating technique customarily adopted for ordinary ABS resins can be adopted in the present invention. The resin article may be entirely or partially wet-plated. In case of a partial wet plating, a non-plated portion may be covered with a masking member at the wet plating step. For example, the techniques disclosed in Japanese Patent Publication No. 16987/1973 and Japanese Patent Application Laid-Open Specification No. 124432/1977 may be adopted, though techniques that can be adopted in the present invention are not limited to these ones.

The present invention will now be described in detail with reference to the following examples. All of "parts" and "%" in the examples and comparative examples are by weight unless otherwise indicated.

EXAMPLE 1

An autoclave was charged with 280 parts of pure water and 100 parts, in terms of solids, of a polybutadiene latex (having a solid content of 35%) having a weight average particle size of 60 mμ, and 1.0 part of potassium stearate, 0.0075 part of ferrous sulfate, 0.015 part of sodium ethylene-diaminetetraacetate and 0.45 part of sodium formaldehyde sulfoxylate were added and the mixture was heated at 50° C. with stirring. Then a liquid mixture comprising 45 parts of acrylonitrile, 105 parts of styrene, 0.9 part of t-dodecylmercaptan and 0.3 part of diisopropylbenzene hydroperoxide was continuously added to the above mixture over a period of 5 hours. After completion of the addition, 0.15 part of diisopropylbenzene hydroperoxide was further added, and the mixture was stirred at 70° C. for 2 hours to complete the polymerization. The yield was 98%.

An aqueous solution of calcium chloride was added to the obtained polymer latex, and the graft polymer was recovered.

45 parts of this graft polymer was mixed with 55 parts of an acrylonitrile/styrene suspension copolymer (AS resin having an acrylonitrile content of 25%), and the mixture was fed to an extruder and pelletized.

When the melt flow index of the pelletized resin composition was measured according to the method of JIS K-6870 (at 250° C. under a load of 5 kg), it was found that the melt flow index was 18.0 g/10 min.

The pelletized resin composition was injection-molded at a molding temperature of 240° C. with an injection molding machine (Model IS80CN-V supplied by Toshiba Kikai Kabushiki Kaisha) to obtain a plate-like molded article having a size of 80 mm×50 mm×3 mm. The total light transmission of the molded article was 64.5% as measured according to the method of ASTM D-1003. A letter "PLAY" was screen-printed on the central portion of one surface of the molded article with a vinyl chloride resin masking ink, and the corresponding portion of the back surface was broadly covered with the same masking ink. The molded article was subjected to wet plating according to procedures described below. The letter "PLAY" could be clearly read by transmitted light in the obtained plated article.

"Wet Plating Process"

(1) Degreasing (isopropyl alcohol): at room temperature for 5 seconds
(2) Etching (chromic anhydride/sulfuric acid liquid mixture): at 70° C. for 15 minutes
(3) Neutralization (hydrochloric acid): at room temperature for 2 minutes
(4) Catalyzing (palladium chloride/stannous chloride-/aqueous hydrochloric acid solution): at room temperature for 2 minutes
(5) Accelerating (aqueous solution of sulfuric acid): at 55° C. for 2 minutes
(6) Chemical Plating (nickel sulfate/sodium citrate/-sodium hypophosphite/sodium acetate/aqueous ammonium chloride solution): at 32° C. for 5 minutes
(7) Electric Copper Plating: 20μ in thickness
(8) Electric Nickel Plating: 7μ in thickness
(9) Chromium Plating: 0.3μ in thickness The above-mentioned plate-like molded article was directly subjected to wet plating without masking, and the plated resin article was allowed to stand still for 2 hours in an environment maintained at 85° C. and immediately placed in an atmosphere maintained at −20° C. for 2 hours. After this heating/cooling cycle, a transparent plate having 160 of the total number of 5 mm squares written thereon was placed on the plated resin plate (80×50×3 mm³), and the number of squares deprived of the plating layer was counted. This counting was performed on the front and back surfaces of the plated resin plate, and the sum of squares deprived of the plating layer on the front and back surfaces was designated as "the number of peels". In the above-mentioned sample, the number of peels was 36 relative to 320 of the total number of squares on the front and back surfaces.

EXAMPLES 2 THROUGH 4 AND COMPARATIVE EXAMPLE 1

Polymers were obtained by carrying out the graft polymerization in the same manner as described in Example 1 except that the particle size of the polybutadiene rubber latex was changed as shown in Table 1.

In the same manner as described in Example 1, each polymer was pelletized and a molded article was formed. The total light transmissions of the obtained molded articles are shown in Table 1.

When the molded articles were partially plated in the same manner as described in Example 1, in the plated molded articles except the plated molded article obtained in Comparative Example 1, the letter "PLAY" could be clearly read by transmitted light.

In each of plated resin articles prepared from the above-mentioned molded articles, the number of peels was counted. The obtained results are shown in Table 1.

TABLE 1

|  | Particle Size (mμ) | Total Light Transmission (%) | Number of Peels | Melt Flow Index (g/10 min) |
| --- | --- | --- | --- | --- |
| Example 2 | 100 | 55.9 | 30 | 18.8 |
| Example 3 | 120 | 48.9 | 41 | 19.2 |
| Example 4 | 150 | 39.4 | 28 | 20.0 |
| Comparative Example 1 | 180 | 30.1 | 25 | 22.1 |

EXAMPLE 5 AND COMPARATIVE EXAMPLE 2

Pellets were obtained in the same manner as described in Example 1 except that the proportions of the graft polymer and the AS resin were changed as shown in Table 2.

The pellets were molded, plated and evaluated in the same manner as described in Example 1. The obtained results are shown in Table 2.

TABLE 2

|  | Example 5 | | | Comparative Example 2 | |
| --- | --- | --- | --- | --- | --- |
| Graft polymer (parts) | 25 | 37.5 | 60 | 12.5 | 70 |
| AS resin (parts) | 75 | 62.5 | 40 | 87.5 | 30 |
| Rubber content (%) | 10 | 15 | 24 | 5 | 28 |
| Total light transmission (%) | 73.6 | 68.2 | 49.8 | 82.0 | 43.2 |
| Number of peels | 72 | 48 | 30 | 185 | 28 |
| Melt flow index (g/10 min) | 27.8 | 21.8 | 10.2 | 33.3 | 5.9 |

EXAMPLE 6

To 100 parts of the ABS resin described in Example 1 was added 1.5 parts of stearyl alcohol, and the mixture was pelletized.

The melt flow index of the resin was 18.8 g/10 min and the total light transmission was 64.0%. The number of peels in a plated molded article obtained from the pelletized resin was 12.

COMPARATIVE EXAMPLE 3

A transparent ABS resin comprising 11.4% of polybutadiene, 4.5% of acrylonitrile, 38.8% of styrene and 45.3% of methyl methacrylate was molded and plated in the same manner as described in Example 1. When the number of peels was measured, it was found that the plating layer was peeled substantially on the entire surface.

EXAMPLE 7

An autoclave was charged with 560 parts of pure water and 100 parts, in terms of solids, of a polybutadiene latex (having a solid content of 35%) having a weight average particle size of 60 mμ, and 1.0 part of potassium stearate, 0.015 part of ferrous sulfate, 0.03 part of sodium ethylene-diaminetetraacetate and 0.9 part of sodium formaldehyde sulfoxylate were added and the mixture was heated at 50° C. with stirring. Then, a liquid mixture comprising 75 parts of acrylonitrile, 225 parts of styrene, 1.8 parts of t-dodecylmercaptan and 0.6 part of diisopropylbenzene hydroperoxide was continuously added to the above mixture over a period of 5 hours. After completion of the addition, 0.3 part of diisopropylbenzene hydroperoxide was further added and the mixture was stirred at 70° C. for 2 hours to complete the polymerization. The yield was 98%.

An aqueous solution of calcium chloride was added to the polymer latex, and the polymer was recovered.

To 72 parts of the obtained polymer was added 28 parts of an acrylonitrile/styrene suspension copolymer (AS resin having an acrylonitrile content of 25%), and the resin composition was supplied to an extruder and pelletized.

The pelletized resin composition was molded, plated and evaluated in the same manner as described in Example 1. The melt flow index was 22.5 g/10 min, the total light transmission was 64.8% and the number of peels was 78.

EXAMPLE 8

An autoclave was charged with 110 parts of pure water and 100 parts, in terms of solids, of a polybutadiene latex having a weight average particle size of 60 mμ, and 1.0 part of potassium stearate, 0.003 part of ferrous sulfate, 0.006 part of sodium ethylene-diaminetetraacetate and 0.18 part of sodium formaldehyde sulfoxylate were added and the mixture was heated at 50° C. with stirring. Then, a liquid mixture comprising 15 parts of acrylonitrile, 45 parts of styrene, 0.36 part of t-dodecylmercaptan and 0.12 part of diisopropylbenzene hydroperoxide was continuously added over a period of 5 hours. After completion of the addition, 0.06 part of diisopropylbenzene hydroperoxide was further added and the mixture was stirred at 70° C. for 2 hours to complete the polymerization. The yield was 98%.

An aqueous solution of calcium chloride was added to the obtained polymer latex and the polymer was recovered.

To 28.8 parts of the obtained polymer was added 71.2 parts of an acrylonitrilestyrene suspension copolymer (AS resin having an acrylonitrile content of 25%), and the resin composition was supplied to an extruder and pelletized.

The pelletized resin composition was molded, plated and evaluated in the same manner as described in Example 1. The melt flow index was 17.8 g/10 min, the total light transmission was 59.2%, and the number of peels was 34. A few silver streaks were observed on the surface of the molded article.

EXAMPLE 9

45 parts of the graft polymer obtained in Example 1 were mixed with 55 parts of an acrylonitrile-α-methylstyrene suspension copolymer (acrylonitrile content 29.5%) and the mixture obtained was formed to pellets by means of an extruder. The pellets were tested in the same manner as in Example 1.
Melt flow index: 7.2 g/10 minutes
Total light transmission: 51.8%
Number of Peels: 18.

What is claimed is:

1. A metal plated resin article formed by subjecting a molded article of a transparent vinyl cyanide-conjugated diene-aromatic vinyl resin comprising 10 to 24% by weight of a conjugated diene rubber having a weight average particle size of 150 mµ or less and a copolymer of a vinyl cyanide monomer and an aromatic vinyl monomer as a continuous resin phase, said continuous resin phase copolymer not containing a component having an ester bond, said vinyl cyanide-conjugated diene-aromatic vinyl resin containing incorporated therein an alcohol or phenol having a boiling point of 200° C. or above in an amount of 0.1 to 10 parts by weight per 100 parts by weight of the vinyl cyanide-conjugated diene-aromatic vinyl resin, to wet metal plating.

2. A metal plated resin article as set forth in claim 1, wherein the transparent vinyl cyanide-conjugated diene-aromatic vinyl resin is one obtained by emulsion-polymerizing a vinyl cyanide monomer and an aromatic vinyl monomer in the presence of a diene rubber latex having a weight average particle size of 150 mµ or less.

3. A metal plated resin article as set forth in claim 2 wherein the vinyl cyanide is acrylonitrile and the aromatic vinyl component is styrene.

4. A metal plated resin article as set forth in claim 1 wherein the vinyl cyanide is acrylonitrile and the aromatic vinyl component is styrene.

5. A metal plated resin article as set forth in claim 1 wherein the vinyl cyanide is acrylonitrile and the aromatic vinyl component is styrene.

* * * * *